United States Patent [19]

Alexandrescu

[11] 4,071,863
[45] Jan. 31, 1978

[54] STATIONARY MAGNETIC TAPE TRANSDUCING SYSTEM WITH MEANS FOR CONTROLLING THE AIR BEARING SUPPORT

[75] Inventor: Mircea Alexandrescu, Erlangen, Germany

[73] Assignee: Siemens Aktiengesellschaft, Berlin & Munich, Germany

[21] Appl. No.: 698,416

[22] Filed: June 21, 1976

[30] Foreign Application Priority Data

Oct. 6, 1975 Germany .............................. 2544667

[51] Int. Cl.² ...................... G11B 21/02; G11B 15/64; G11B 15/66
[52] U.S. Cl. .................................... 360/101; 360/102
[58] Field of Search ................... 360/101, 102, 10, 130

[56] References Cited

U.S. PATENT DOCUMENTS

| 3,465,320 | 9/1969 | Weidenhammer et al. | 360/101 |
| 3,525,087 | 8/1970 | Bukovich et al. | 360/102 |
| 3,623,042 | 11/1971 | Woemler et al. | 360/101 |
| 3,872,507 | 3/1975 | Sano et al. | 360/101 |

*Primary Examiner*—Robert S. Tupper
*Attorney, Agent, or Firm*—Hill, Gross, Simpson, Van Santen, Steadman, Chiara & Simpson

[57] ABSTRACT

In an illustrated embodiment a magnetic transducing system utilizes a short length of magnetic tape as an electronic image store. The magnetic tape is held in an arcuate loop configuration by means of an air cushion at the periphery of a rapidly rotating cylinder. The magnetic head or heads may rotate at the same rotational rate as the cylinder and scan along the inner side of the tape loop with essentially zero contact pressure, the tape being free of guiding means at its outer side except at its entrance point to the loop, and having a trailing free end slightly spaced from the entrance point. A cartridge may supply a length of magnetic tape approximately equal to the circumference of the cylinder to the system for a transducing operation and then rewind the tape for protected storage.

2 Claims, 2 Drawing Figures

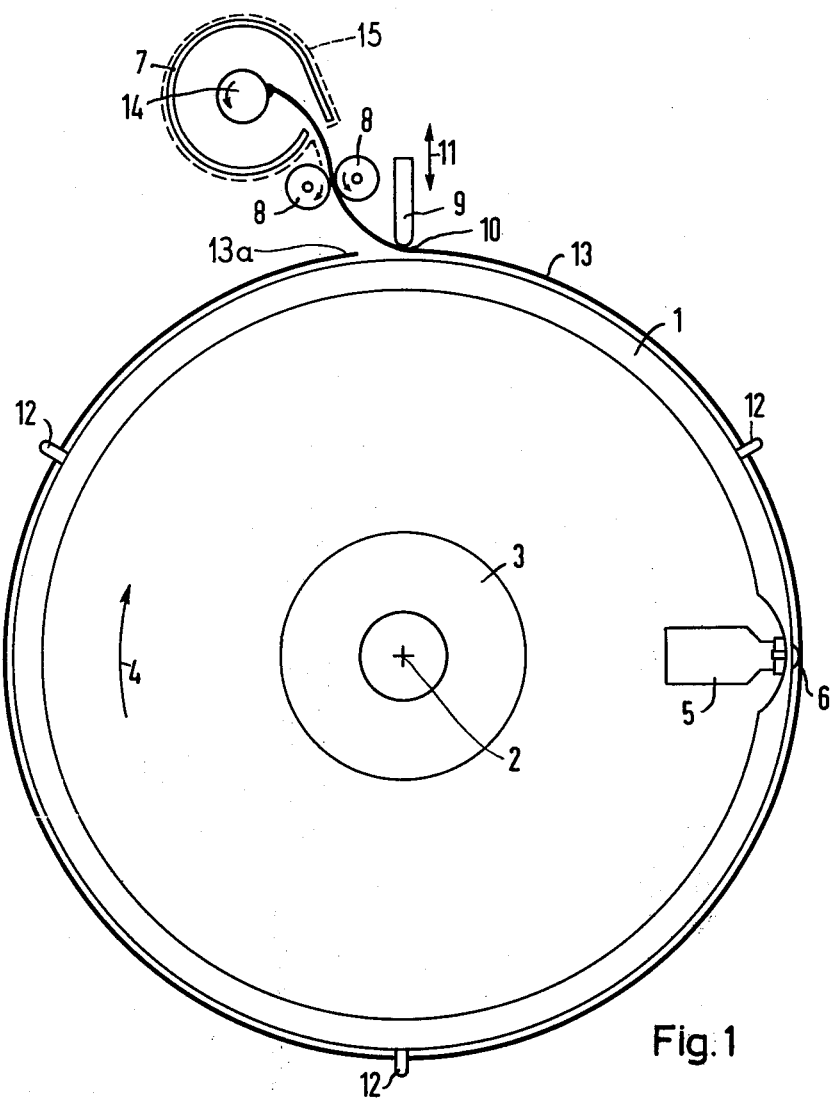
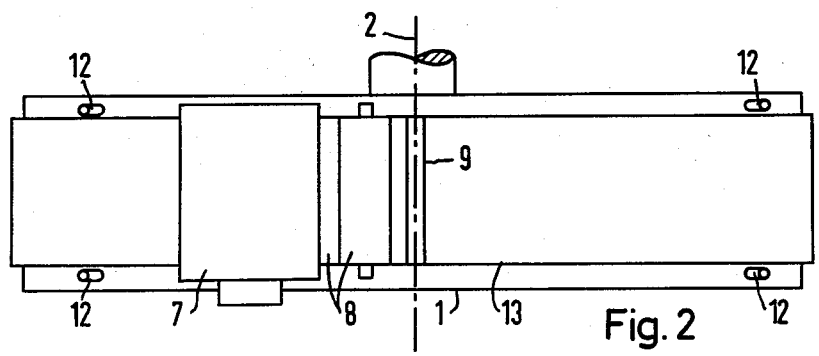

STATIONARY MAGNETIC TAPE TRANSDUCING SYSTEM WITH MEANS FOR CONTROLLING THE AIR BEARING SUPPORT

BACKGROUND OF THE INVENTION

The invention concerns a device for recording and/or reproducing information on a magnetic tape medium, for example an individual television image frame, by means of a cylinder around which the tape is wound, and with which is associated at least one rotatably arranged recording and/or reproducing head, for example a video head.

In known devices of this type, the cylinder around which the magnetic tape is guided is stationary, and the video head is carried on a rotary disc and projects through a gap in the cylinder so as to establish a pressure engagement with the magnetic tape. During reproducing operation, the tape is drawn over the cylinder, and the video head disc is rotated at a speed suitable to the transducing of a recorded television signal, for example. If an individual recorded frame is to be reproduced, the tape is stopped in order that the same track on the tape may be repeatedly scanned by the video head. Since the video head is firmly pressed against the tape, reproduction of an individual recorded image by means of repeated scanning of a record track is only possible during a comparatively short period of time if the tape is not to be damaged.

It is also prior art to employ other types of record media such as magnetic disc configurations for the purpose of storage and reproduction of an individual recorded image, for example by the repeated sequential scanning of recorded interlaced fields of a conventional television frame signal. Here, an individual image reproduction by means of repeated successive scanning of the same track over a long period of time is, indeed, possible; however, these devices are very complicated and expensive, and require a relatively expensive record medium in comparison to ordinary magnetic video tape.

SUMMARY OF THE INVENTION

Therefore, the object underlying the present invention is to produce a device operable with a magnetic tape record medium but wherein the reproduction of an individual recorded image is possible over a comparatively long period of time without the tape becoming damaged because of a substantial magnitude of pressure contact between the video head and the tape.

This problem is solved in accordance with the present invention by the provision of a cylinder which is rotatably mounted about the rotational axis of the head, and is connected to a driving motor which provides the cylinder with a rotational speed such that an air cushion is formed between the tape and the cylinder. Preferably tape retaining and guiding means are present by which one end of the tape is retained relative to the cylinder for determining the distance between the tape and the cylinder, and for laterally constraining the tape. Most preferably the video head rotates with the cylinder so that there is no relative motion therebetween, and the video head projects beyond the cylinder surface to such an extent that it barely touches a tape wrapped about the cylinder. In contrast to the known devices, in the device as specified by the present invention, the cylinder is driven at such a rotational speed that the tape is held out of contact therewith. Further, the arrangement is such that the video head does not engage the tape with the substantial magnitude of pressure contact of prior art devices, but exerts instead only a very minimal pressure on the tape. Experiments have shown that a satisfactory operation is possible even if a small air gap is present between the video head and the tape. Therefore, an individual image may be repeatedly scanned over an extended time without damaging the tape.

It is possible within the framework of the invention to provide a plurality of video heads, such heads for example being arranged along a line running parallel to the cylinder axis, for the purpose of recording and/or reproducing a plurality of individual recorded images on a plurality of parallel tracks along the length of the magnetic tape. It is also possible, for example, to support a single video head so as to be displaceable along a line running parallel to the longitudinal axis of the cylinder.

By way of example, if the video head is to be axially movable relative to the cylinder during joint rotation of the head and the cylinder, the cylinder could be provided with an axially extending slot along which the video head could move to shift across the width of the magnetic tape, with a covering mask associated with the video head at each lateral side thereof for the purpose of covering the axial slot in each successive lateral position of the head relative to the cylinder, so that the air flow at the surface of the cylinder is not affected by the presence of the slot. As another example, it is also conceivable for the record medium to be displaced relative to the drum surface and/or video head circular path. For example, the tape may be shifted axially of the cylinder so as to provide for the scanning by the video head of successive laterally offset track segments on the magnetic tape.

Further advantageous features of the invention reside in the mounting of the video head for rotation with the cylinder, the cylinder having a rotational speed of at least approximately 1500 revolutions per minute, for example, and preferably such that a revolution of the video head takes place at a rate corresponding to a video image rate providing for a persistent display of a recorded image without flicker on a conventional broadcast television receiver or similar display device. Further advantageous features relate to the provision of a cartridge for the magnetic tape containing a length of tape corresponding to the circumference of the cylinder, the provision of feed rollers for supplying a free end of the tape from such a cartridge to the tape path about the cylinder, and the provision of a guide bar with a tape guide edge arranged at a distance from the cylinder surface which is adjustable to adjustably determine the distance between the tape and the cylinder.

Other objects, features and advantages of the present invention will be apparent from the following detailed description taken in connection with the accompanying sheet of drawing.

BRIEF DESCRIPTION OF THE DRAWING

FIG. 1 is a somewhat diagrammatic side elevational view of an embodiment in accordance with the present invention; and FIG. 2 is a diagrammatic plan view of the device as shown in FIG. 1.

DETAILED DESCRIPTION

In the drawing, a hollow cylinder 1 is illustrated which is mounted for rotation about an axis 2. Cylinder 1 is rotated by an electric motor 3 in the direction of arrow 4, preferably at a speed of at least about 1500 revolutions per minute. For example, with a complete frame being transduced per revolution of the cylinder, the cylinder might rotate at 25 revolutions per second or 30 revolutions per second (1500 or 1800 revolutions per minute). Similarly, if one revolution of the cylinder is to correspond to the transducing of one image field, where two interlaced fields represent a complete image frame, the cylinder one may rotate at 50 or 60 revolutions per second (3000 or 3600 revolutions per minute). A video head 5 is mounted on the cylinder 1 for rotation with the cylinder about axis 2 in the direction of arrow 4 such that the head 5 makes the number of revolutions per second required for transducing operation at the desired frame or field rate, for example. FIG. 1 shows the video head 5 as having its tape scanning section 6 projecting somewhat beyond the cylinder surface.

In the illustrated embodiment, a tape cartridge 7 is shown as supplying a length of magnetic tape accommodating an individual image field, or a frame consisting, for example, of two interlaced image fields. In order to record or reproduce an individual image, the cartridge 7 is associated with a suitable tape constraining means which may include two feed rolls 8 and a guide bar 9 with a tape engaging guide edge 10. The guide bar is adjustable in the direction of arrow 11 toward and away from the surface of the cylinder 1. The cylinder 1 is shown as having axially spaced sets of guide pins 12 disposed about its surface for the purpose of lateral guidance and confinement of the tape. In the illustrated embodiment, the guide pins 12 are secured to the surface of the cylinder 1 and are disposed in respective planes which lie at right angles to the cylinder axis 2 and which are separated by a distance approximately corresponding to the tape width.

For recording and/or reproducing of an individual image, a cartridge 7 with a magnetic tape wound thereon is mounted adjacent the feed rollers 8 in the location shown in FIG. 1, and the free end of the magnetic tape in the cartridge 7 is inserted between rolls 8. The latter are driven in the direction of the respective arrows indicated in FIG. 1 so as to insert the free end of the magnetic tape between the surface of cylinder 1 and guide bar 9. On account of the high rotational speed of cylinder 1, the free end of tape 13 is drawn along on the cylinder surface until it is wound about the cylinder approximately once in the manner illustrated. Once the tape has reached the illustrated position on cylinder 1, further feed of the tape is automatically stopped, for example by automatically stopping the rolls 8. This may take place in such a manner that the tape is measured in its length so as to correspond to the cylinder circumference, and when the tape is completely unwound from spool 14 within cartridge 7, a switch is activated which stops the driving motor for rolls 8.

Video tape 13 now is positioned as shown in FIG. 1 by means of an air cushion which is formed between the tape 13 and the cylinder 1. Video head 5 is shown as having its scanning section 6 projecting from the drum surface to such an extent that it barely touches the tape or that there is a very small air gap between the tape and scanning section 6 of video head 5 which gap is sufficiently minute so that it does not interfere with the recording and reproducing of a video image on the magnetic tape 13. Due to the air cushion between the surface of cylinder 1 and tape 13, and because scanning section 6 of video head 5 exerts almost no pressure on tape 13, tape 13 is subjected to a very minimum of wear, particularly during reproduction of an individual recorded image for example by repeated scanning of the same longitudinal track on the magnetic tape 13, so that individual image reproduction is feasible over an extended period of time.

The length of video tape 13 in cartridge 7 is preferably such that when a cartridge is placed at the location shown in FIG. 1, and the tape is then fully unwound from the spool 14 as shown in FIG. 1, the video tape 13 will extend precisely in substantially a complete loop path about the cylinder as shown in FIG. 1, so that interference-free individual image reproduction is possible by means of repeated scanning of the recording track or tracks on video tape 13.

The air flow about cylinder 1 may be adjusted by adjusting the distance of guide bar 9 from cylinder 1.

The transmission of signals to and from the video head 5 may take place by means such as conventionally used for present rotating head systems; for example, a slip ring and brush assembly or an equivalent means utilizing rotating mercury contacts. In addition to the video head 5, an erase head may also be present in cylinder 1, the energizing current for the erase head being supplied via a suitable conductive path provided by the slip ring and brush assembly or the equivalent.

A multiple track recording and reproduction with of the order of magnitude of 50 tracks on a video tape is possible if video head 5 is supported for movement along a slot in cylinder 1 extending parallel to the axis 2. With such an arrangement, for example, a multiplicity of tracks may be scanned selectively or in sequence by means of a single video head. On the other hand, multiple track recording and reproduction is also possible if a plurality of video heads are provided with their scanning sections corresponding to scanning section 6 in FIG. 1 arranged along a line running parallel to the cylinder longitudinal axis, that is perpendicular to the plane of FIG. 1. In this instance, a respective desired one of the video heads may be activated for transducing a signal with respect to its associated track on tape 13. In this way, a series of recorded images on respective tracks could be selectively or sequentially reproduced as desired.

The device illustrated in FIGS. 1 and 2 is suitable for recording as well as for reproduction of an individual image. Recording may take place on a blank magnetic tape, while an individual recorded image on the tape 13 may be reproduced for a random amount of time as desired once the tape has been inserted between feed rolls 8 and wrapped on the cylinder 1 in the manner illustrated.

It is significant in terms of the subject of the invention that almost no mechanical friction occurs between video head 5 and video tape 13. No costly component elements need be used as a storage medium for individual images; a short length of video tape such as shown in FIG. 1 is sufficient.

For the sake of supplementary detail, it may be noted that the illustrated embodiment may be such that tape 13 has an end thereof fixed to hub 14 sufficiently securely so as to stop tape feed even if rollers 8 continue to be driven after the position shown in FIG. 1 is reached. Under these circumstances, rollers 8 could be disengaged from the tape, or placed in a condition to freely rotate in the reverse direction, and the hub 14 then suitably driven in the direction of the arrow, that is counterclockwise as viewed in FIG. 1, to rewind tape 13 onto the hub 14. Simply by way of example, the rewind of the tape onto hub 14 may be by means of a suitable rewind drive motor which may be manually controlled so as to stop the rewind operation with the free end of the magnetic tape 13 adjacent the inlet to feed rollers 8, for example. If the rollers 8 have been disengaged from the tape during the rewind operation, the rewind motor may be stopped with the free end of the tape between rollers 8, for example, and the cartridge 7 will still be removable and replaceable. Cartridge 7 may be removable and replaceable relative to a receptacle 15 which has a drive spindle of conventional type operable to rewind the tape onto the spool 14 of the cartridge. In the illustrated embodiment the free end 13a of the tape 13 is of the same thickness and degree of flexibility as the remainder of the length of the tape and has a magnetizable layer at its inner surface which is continuous with the magnetizable layer along the remaining length of the tape. The video head 5 may have a scanning section 6 with pole tips separated by a scanning gap of about one micron in physical dimension in the direction of head movement for video recording and playback operation.

While there have been disclosed exemplary embodiments representing presently preferred practice of the claimed invention, it will be apparent that many further modifications and variations may be effected without departing from the scope of the novel teachings and concepts of the present invention.

I claim as my invention:

1. A magnetic tape system providing transducing of a stationary length of magnetic tape having a free end and a fixed end including a cylinder having a cylindrical periphery for receiving a length magnetic tape thereabout, and a transducer head mounted for rotary movement about a head rotational axis during transducing operation with respect to a magnetic tape extending about the periphery of said cylinder, said cylinder being rotatably mounted for rotation on an axis corresponding to said rotational axis, a drive motor connected to said cylinder for driving said cylinder at such a rotational speed that an air cushion is formed between the periphery of the cylinder and a magnetic tape extending about said periphery, and tape constraining means adjustably determining the distance between the periphey of the cylinder and a tape extending thereabout, the transducer head being disposed with respect to the periphery of the cylinder to be in operative scanning relation to a magnetic tape as positioned by said tape constraining means, said tape constraining means comprising a guide bar with a tape guide edge adjustable toward and away from the cylinder periphery, drive means for inserting the free end of the magnetic tape between the cylinder periphery and the tape guide edge of said guide bar, whereby the free end of the magnetic tape, upon insertion between the tape guide edge and the cylinder periphery, is drawn about the cylinder periphery by the resulting air flow.

2. A transducing system according to claim 1 with lateral tape guide means on the cylinder to provide for lateral guidance and confinement of the tape.

* * * * *